United States Patent

[11] 3,607,962

[72] Inventors: Hans Krekeler, Wiesbaden; Klaus Gunther, Frankfurt am Main; Heinz Schmitz, Frankfurt am Main, all of Germany
[21] Appl. No.: 794,808
[22] Filed: Jan. 28, 1969
[45] Patented: Sept. 21, 1971
[73] Assignee: Farbwerke Hoechst Aktiengesellschaft Vormals Meister, Lucius & Bruning Frankfurt am Main, Germany
[32] Priority: Feb. 28, 1968
[33] Germany
[31] P 16 68 102.0

[54] PROCESS FOR THE MANUFACTURE OF ACETYLENE
10 Claims, No Drawings

[52] U.S. Cl. .................................................. 260/679 R, 260/654 D, 260/656

[51] Int. Cl. .................................................. C07c 11/24
[50] Field of Search .......................................... 260/679, 677 H, 656, 654 D

[56] References Cited
UNITED STATES PATENTS

| | | | |
|---|---|---|---|
| 2,322,258 | 6/1943 | Strosacker et al. | 260/654 |
| 3,122,591 | 2/1964 | Eberly | 260/656 |
| 2,803,679 | 8/1957 | Conrad | 260/656 |

FOREIGN PATENTS

| | | | |
|---|---|---|---|
| 1,525,522 | 4/1968 | France | 260/679 |

Primary Examiner—Delbert E. Gantz
Assistant Examiner—J. M. Nelson
Attorney—Curtis, Morris & Safford

ABSTRACT: Process for the manufacture of acetylene and its homologs by dehydrohalogenating dihalogen-alkanes or monohalogen-alkenes by means of alkaline earth metal oxides or alkaline earth metal hydroxides.

PROCESS FOR THE MANUFACTURE OF ACETYLENE

The present invention relates to a process for the manufacture of alkines, i.e., acetylene and its homologs by dehydrohalogenation of dihalogen-alkanes or monohalogen-alkenes.

It is known to produce hydrocarbons containing triple bonds by dehydrohalogenation of suitable compounds. When, for example, a concentrated alcoholic solution of potassium hydroxide is reacted with dibromoethane, acetylene and vinyl bromide are obtained. Methyl-acetylene can be obtained from 1,2-dibromopropane by reacting the latter with a solution of potassium hydroxide in butyl alcohol at boiling temperature or by heating for a period of 12 hours 1,1-dibromopropane with potassium hydroxide and ethyl alcohol.

Higher acetylene homologs are obtained in analogous manner by reacting the corresponding dibromo-compounds with alkali metal hydroxides dissolved in suitable alcohols.

The present invention provides a process for the manufacture of acetylene and its homologs by dehydrohalogenation of dihalogen-alkanes or monohalogen-alkenes which comprises reacting dihalogen-alkanes or monohalogen-alkenes or mixtures thereof with alkaline earth metal oxides or alkaline earth metal hydroxides or mixtures thereof.

As dihalogen-alkanes there can be used, for example, 1,2-dichloroethane, 1,1-dichloroethane, 1,2-dibromoethane, 1,1-dibromoethane, 1,2-diiodoethane, or 1,1-diiodoethane which are dehydrohalogenated to yield acetylene. 1,2-dichloropropane, 1,1-dichloropropane, 2,2-dichloropropane, 1,2-dibromopropane, 1,1-dibromopropane, 2,2-dibromopropane, 1,2-diiodopropane, 1,1-diiodopropane or 2,2-diiodopropane can be reacted to methyl-acetylene. 2,3-dichlorobutane, 2,3-dibromobutane and 2,3-diiodobutane yield dimethyl-acetylene in the dehydrohalogenation and 1,2-dichlorobutane, 1,1-dichlorobutane, 2,2-dichlorobutane, 1,2-dibromobutane, 1,1-dibromobutane, 2,2-dibromobutane, 1,2-diiodobutane, 1,1-diiodobutane and 2,2-diiodobutane yield ethyl-acetylene in the dehydrohalogenation.

Of the group of monohalogen-alkenes acetylene is obtained from vinyl chloride, vinyl bromide and vinyl iodide; methylacetylene is obtained from 1-chloropropene-1, 2-chloropropene-1, 1-bromopropene-1, 2-bromopropene-1, 1-iodopropene-1, or 2-iodopropene-1; dimethyl-acetylene is obtained from 2-chlorobutene-2, 2-bromobutene-2, and 2-iodobutene-2; and ethyl-acetylene is obtained from 1-chlorobutene-1, 2-chlorobutene-1, 1-bromobutene-1, 2-bromobutene-1, 1-iodobutene-1 and 2iodobutene-1.

In the dehydrohalogenation of dihalogen-alkanes there are obtained, besides the desired alkines, varying proportions of the corresponding monohalogen-alkene depending on the reaction conditions. The latter can be readily separated from the alkine and recycled into the reaction or subjected to a separate dehydrohalogenation.

From among the specified starting compounds, the dibromo-alkanes and monobromoalkenes or mixtures thereof are especially suitable for the dehydrohalogenation with alkaline earth metal oxides or alkaline earth metal hydroxides or mixtures thereof. Dichloroalkanes and monochloroalkenes are more difficult to dehydrohalogenate and give lower yields than the corresponding bromine and iodine compounds.

The manufacture of diiodo-alkanes and moniodo-alkenes is more complicated than that of the dibromo-alkanes and monobromo-alkenes. The bromine compounds can be obtained in a very good yield and under mild conditions in simple manner by reacting bromine with the corresponding alkenes or by oxibromination of the alkenes.

For the manufacture of acetylene, 1,2-dibromoethane or vinyl bromide are especially suitable, whereas methylacetylene is best produced from 1,2-dibromopropane or 1-bromopropene-1. The best yields of dimethyl-acetylene are obtained with 2,3-dibromobutane or 2-bromobutene-2, whereas ethyl-acetylene is obtained most advantageously from 1,2-dibromobutane and 1-bromobutene-1.

The alkaline earth metal oxide and hydroxides used for the dehydrohalogenation reaction are those of the metals barium, strontium, calcium and magnesium. With diminishing alkalinity of the alkaline earth metal compounds used the ratio of alkine to monohalogen-alkene in the formed gaseous products shifts under identical conditions towards an increased formation of monohalogen-alkene. Barium oxide or barium hydroxide gives the best results in the dehydrohalogenation reaction.

The reaction of the dihalogen-alkane or monohalogen-alkene with the alkaline earth metal oxide or alkaline earth metal hydroxide takes place with the formation of alkaline earth metal halide. The reaction of 1,2-dibromo-ethane and vinyl bromide with barium hydroxide is illustrated by the following equations:

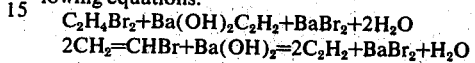

$$C_2H_4Br_2 + Ba(OH)_2 \rightarrow C_2H_2 + BaBr_2 + 2H_2O$$
$$2CH_2=CHBr + Ba(OH)_2 = 2C_2H_2 + BaBr_2 + H_2O$$

The dehydrohalogenation of the dihalogen-alkanes or monohalogen-alkenes by means of alkaline earth metal oxide or alkaline earth metal hydroxide can be performed in various ways. Especially suitable are solutions or dispersions of alkaline earth metal oxides in high boiling, monohydric or polyhydric alcohols. Particularly advantageous solvents or dispersion media for the alkaline earth metal oxides are glycols, for example ethylene glycol or butane-diol(1,4) and glycerol. These alcohols react with the pulverized alkaline earth metal oxide with relatively strong heating. The solvent or dispersion medium need not be anhydrous, this being of considerable advantage when the reaction is carried out on an industrial scale. A concentration of the alkaline earth metal oxide as high as possible in the alcohol used is advantageous for the dehydrohalogenation reaction. Especially good results are obtained, for example, with a solution of 300 grams of barium oxide per liter of ethylene glycol.

It is likewise possible to use aqueous solutions or suspensions of alkaline earth metal hydroxides and molten alkaline earth metal hydroxides. The separation of hydrogen halide from the dihalogen-alkanes or monohalogen-alkenes can also be performed in the gaseous phase in the presence of solid alkaline earth metal oxide or alkaline earth metal hydroxide.

It is surprising that in spite of the lower basicity and the poorer solubility of the alkaline earth metal oxides and alkaline earth metal hydroxides than the alkali metal oxides and alkali metal hydroxides the dehydrohalogenation reaction can be carried out with good results.

The temperature range within which the dehydrohalogenation reaction can be carried out is very large. The optimum reaction temperatures largely depend on the mode of execution of the dehydrohalogenation reaction. The temperature depends, for example on whether the reaction is performed in aqueous or alcoholic solution or dispersion, in the melt or in the gaseous phase with solid alkaline earth metal oxide or alkaline earth metal hydroxide.

When the dehydrohalogenation reaction is carried out in an alkaline earth metal oxide/alcohol system, it is especially smooth at a temperature in the range of from 100 to 250° C. With the use of lower temperatures only one mole of hydrogen halide is preferably separated from the dihalogen-alkane used, whereby the ratio of alkine to monohalogen-alkene in the gaseous reaction products is diminished. At higher temperatures byproducts may form which reduce the yield of alkine. In the reaction of 1,2-dibromoethane in the system of barium oxide and glycol optimum results are obtained at a temperature of 140° C.

In the system of alkaline earth metal oxide and alcohol the dehydrohalogenation reaction of dihalogen-alkanes takes place practically instantaneous. The ratio of alkine to monohalogen-alkene formed depends on the choice and the concentration of the alkaline earth metal oxide/alcohol system, the temperature and the time of reaction. A lower alkalinity of the alkaline earth metal oxide used and a lower reaction temperature necessitate a longer time of reaction to transform the monohalogen-alkene formed into alkine. Depending on the reaction conditions, the periods required for a high conversion range from 5 to 500 seconds. When vinyl bromide was reacted in the system of barium oxide and glycol at 140° C. with a residence time of about 80 seconds a conversion of vinyl bromide to acetylene of about 90 percent was obtained, calculated on the amount of gaseous vinyl bromide in liquid barium oxide/glycol.

When aqueous solutions of alkaline earth metal hydroxides are used for the dehydrohalogenation of dihalogen-alkanes or monohalogen-alkenes the reaction can be carried out, in principle, under the same conditions, i.e. type and concentration of the alkaline earth metal hydroxide, reaction temperature and residence time, as with the above system of alkaline earth metal oxide and alcohol. With an aqueous system a reaction temperature of about 105° C. can only be obtained at atmospheric pressure. As already mentioned above, under these conditions the monohalogen-alkene is preferably formed in addition to the alkine when a dihalogen-alkane is reacted. To carry out the reaction at higher temperatures, operating under pressure is necessary. The pressure for a definite temperature is essentially given by the vapor pressure/temperature function of water. Moreover, owing to the hydrophobic character of the dihalogen-alkanes and monohalogen-alkenes used, the reaction with the alkaline earth metal hydroxide in the aqueous system is impeded. The reaction can be considerably improved by adding commercial emulsifiers which do not form difficulty soluble compounds with the alkaline earth metal compounds used. From among the alkaline earth metal hydroxides barium hydroxide is especially suitable for aqueous systems. Calcium and strontium hydroxide solutions may also be used for the separation of hydrogen halide, but with barium hydroxide the amounts of acetylene formed under identical conditions are higher than with an aqueous calcium hydroxide solution.

For the dehydrohalogenation of dihalogen-alkanes or monohalogen-alkenes to alkines molten alkaline earth metal hydroxides may also be used. Especially suitable is barium hydroxide octahydrate which melts at 78° C. in its water of crystallization. Barium hydroxide and strontium hydroxide free from water of crystallization which melt at 410 and 375° C., respectively, without decomposition can also be used in the dehydrohalogenation reaction.

Especially good results are obtained with mixtures of these two alkaline earth metal hydroxides with other salts, for example alkaline earth metal bromides. By selecting suitable salts and concentrations systems having a melting point below 350° C. can be obtained and used for the dehydrohalogenation reaction.

The use of molten alkaline earth metal hydroxide or a melt containing alkaline earth metal hydroxide has the advantage over the system alkaline earth metal oxide/alcohol that an organic solvent need not be used. As compared with aqueous alkaline earth metal hydroxide solutions melts of alkaline earth metal hydroxides free from water of crystallization allow of carrying out the reaction with application of pressure.

The separation of hydrogen halide from dihalogen-alkanes or monohalogen-alkenes can also be performed in the gaseous phase in the presence of solid alkaline earth metal oxide or alkaline earth metal hydroxide. Vinyl chloride, for example, reacts at a temperature above 300° C. with finely pulverized magnesium oxide with formation of acetylene.

In general, the vaporous starting product is passed at a temperature in the range of from 200 to 500° C. over fine-grained alkaline earth metal oxide or alkaline earth metal hydroxide. The unreacted dihalogen-alkane or the monohalogen-alkene is separated from the gaseous alkines by condensation. In the dehydrohalogenation a layer of alkaline earth metal halide forms on the surface of the alkaline earth metal oxide. With increasing formation of alkaline earth metal halide the formation of alkine diminishes.

To ensure the continuity of the dehydrohalogenation reaction care must be taken that the alkaline earth metal oxide or alkaline earth metal hydroxide used is continually renewed. This can be done by passing, by means of a screw, fresh alkaline earth metal oxide or alkaline earth metal hydroxide continuously through the reactor, advantageously in countercurrent flow with the vaporous starting product. Alternatively, the dehydrohalogenation can be carried out in a fluidized bed with fine-grained alkaline earth metal oxide or alkaline earth metal hydroxide. It is likewise possible to support the alkaline earth metal oxide or alkaline earth metal hydroxide in known manner on a known carrier material. When operating with a fluidized bed, part of the fluidized material is continuously replaced by fresh material.

The dehydrohalogenation reaction with alkaline earth metal oxide or alkaline earth metal hydroxide can be carried out at atmospheric pressure as well as under superatmospheric pressure. In the latter case the limit of decomposition of the acetylene must be taken into account.

Hitherto, it was only possible to prepare acetylene and its homologs by reacting alkali metal hydroxide with dihalogen-alkanes or monohalogen-alkenes on a laboratory scale. The known process could not be used to produce alkines on an industrial scale. The regeneration of the alkali metal halide formed in the dehydrohalogenation to alkali metal hydroxide can only be carried out at a temperature above 700° C. and therefore requires a high amount of energy, so that an economic production of the alkines by the known process is not possible.

As compared therewith, the use according to the invention of alkaline earth metal oxides or alkaline earth metal hydroxides as dehydrohalogenation agents permits for the first time to produce acetylene and its homologs on an industrial scale in economic manner and high yield. The alkaline earth metal halides formed in addition to the alkines are much easier to transform into the corresponding oxides or hydroxides than alkali metal halides, which must be heated to a temperature above their melting point. Calcium bromide, for example, is hydrolized with steam to a noteworthy extent already at about 350° C. The alkaline earth metal iodides are still more unstable towards steam than the alkaline earth metal bromides. Calcium iodide, for example, cannot be dried completely without considerable decomposition. Atmospheric oxygen oxidizes calcium iodide even at room temperature, when it is heated at a temperature above room temperature oxidation is almost instantaneous. Hence, it follows that for the regeneration on an industrial scale, a cycle process can be used in which the alkaline earth metal halide formed in the dehydrohalogenation reaction is reacted to alkaline earth metal oxide or alkaline earth metal hydroxide by means of steam or oxygen or other oxidants that readily give off oxygen, which alkaline earth metal oxide or hydroxide is again used in the dehydrohalogenation. The hydrogen halide or halogen formed in the regeneration process is reacted in an oxihalogenation or halogenation reaction with fresh alkenes to give dihalogen-alkanes.

The important advantages of the process of the invention are (a) the relatively easy convertibility of the alkaline earth metal halides into the corresponding alkaline earth metal oxides or alkaline earth metal hydroxides, (b) the low conversion temperatures and the resulting low amount of energy required, (c) the very rapid dehydrohalogenation reaction with high yields of alkines with the use of alkaline earth metal oxides and alkaline earth metal hydroxides, (d) the fact that the reaction products are ready to work up and the hydrogen halides and halogens are recovered almost without loss and (e) the continuous mode of execution of the process of the invention.

The acetylene obtained by the dehydrohalogenation reaction with alkaline earth metal oxides and alkaline earth metal hydroxides has a very high degree of purity. It is thus neither necessary to subject the reaction products to complicate working up procedures, such as the separation of carbon (carbon black, graphite), monovinylacetylene, diacetylene, ethylene, methane, hydrogen and possibly carbon oxides, required in the known pyrolysis process, nor to use high amounts of energy required for the pyrolysis of the hydrocarbons.

In the process of the invention the reaction mixture obtained is easy to work up because with the use of dihalogen-alkanes, in addition to the alkine, there is substantially obtained only monohalogen-alkene which can be readily separated from the alkine owing to a great difference in the boiling points.

The process of the invention permits to produce on an industrial scale not only acetylene but also homologs of acetylene as principal products such as methyl-acetylene, dimethyl-acetylene, ethyl-acetylene. Hitherto, these products could only be obtained as byproducts in the conventional pyrolysis or in a relatively complicated manner.

The continuous manufacture of acetylene and its homologs from dihalogen-alkanes or monohalogen-alkenes by means of alkaline earth metal oxides or alkaline earth metal hydroxides by the cycle process described above is especially advantageous where ethylene is available in a sufficient amount since acetylene can then be produced without large technical equipment, i.e. without high temperature pyrolysis or luminous arc pyrolysis, from dihalogen-alkane or vinyl halide. The process of the invention thus permits to transform ethylene into acetylene at low temperatures.

The following examples serve to illustrate the invention but they are not intended to limit it thereto.

EXAMPLE 1

18.8 grams of 1,2-dibromoethane (2.0 to 2.5 grams per minute) were dropped, while stirring at a reaction temperature of 137 to 138° C., into a solution of 66 grams of barium oxide in 230 milliliters of ethylene-glycol in a three necked flask having a capacity of 500 cc. The gas mixture formed was passed over a reflux condenser cooled with water and collected in an aspirator.

| duration of experiment (minutes) | amount of dibromo-ethane added (grams) | amount of gas tb $(ml_n)$ |
|---|---|---|
| 0 | 0 | 0 |
| 5 | 12.0 | 1,210 |
| 8 | 18.8 | 1,960 |
| 10 | — | 2,040 |
| 15 | — | 2,100 |
| 20 | — | 2,100 | composition of gas (free from inert constituents)

| acetylene | 72.2% by volume |
|---|---|
| vinyl bromide | 27.8% by volume |
| hydrogen | <0.01% by volume |
| methane | <0.02% by volume |
| ethylene | 0.01% by volume |
| ethane | <0.01% by volume |

EXAMPLE 2

45 grams of strontium oxide were used instead of barium oxide. After 20 minutes 2,100 ml.$_n$ of gas were obtained.

Gas composition (free from inert constituents)

| acetylene | 60.6% by volume |
|---|---|
| vinyl bromide | 39.4% by volume |

EXAMPLE 3

24 grams of calcium oxide were used instead of barium oxide. After 20 minutes 1,640 ml.$_n$ of gas were obtained.

Composition of gas (free from inert constituents)

| acetylene | 19.9% by volume |
|---|---|
| vinyl bromide | 80.1% by volume |

Further 18.8 grams of dibromoethane were dropped into the calcium oxide/glycol solution. After 20 minutes 1,920 ml.$_n$ of gas were obtained.

Composition of gas (free from inert constituents)

| acetylene | 21.4% by volume |
|---|---|
| vinyl bromide | 78.6% by volume |

The experiment was continued by adding again 18.8 grams of dibromoethane to the calcium oxide/glycol solution. After 20 minutes 1,915 ml.$_n$ of gas were obtained.

Composition of gas (free from inert constituents)

| acetylene | 18.7% by volume |
|---|---|
| vinyl bromide | 81.3 % by volume |

EXAMPLE 4

Instead of dibromoethane (cf. Example 1) 20.2 grams of 1,2-dibromopropane (of about 90 percent strength, remainder consisting of several nonidentified compounds) were used. After 30 minutes 1,790 ml.$_n$ of gas were obtained.

Composition of gas (free from inert constituents)

| methyl-acetylene | 82.2% by volume |
|---|---|
| acetylene | 0.8% by volume |
| vinyl bromide | 4.8% by volume |
| ethylene | 0.018% by volume |
| propylene | 0.04% by volume |
| hydrogen | 0.05% by volume |
| allene | 1.5% by volume |
| nonidentified compounds | 10.7% by volume |

EXAMPLE 5

Instead of ethylene glycol 230 milliliters of glycerol were used (cf. Example 1). During the dropwise addition of dibromoethane the reaction temperature descended from 140° C. to about 120° C. owing to a relatively heavy reflux from the condenser. After 20 minutes the reaction temperature amounted again to 140° C. 1,920 ml.$_n$ of gas were obtained.

Composition of gas (free from inert constituents)

| acetylene | 41.0% by volume |
|---|---|
| vinyl bromide | 59.0% by volume |

EXAMPLE 6

230 milliliters of butanediol-(1,4) were used instead of ethylene glycol (cf. Example 1). After 30 minutes 2,020 ml.$_n$ of gas were obtained.

Composition of gas (free from inert constituents)

| acetylene | 46.8% by volume |
|---|---|
| vinyl bromide | 53.2% by volume |

EXAMPLE 7

400 grams of barium hydroxide octahydrate melting at 78° C. were instead of barium oxide-ethylene glycol (Example 1). The hydroxide was heated to 106° C. During the addition of dibromoethane the reaction temperature dropped owing to the heavy reflux of the vinyl bromide and hydrate water from water, 106° C. to 93° C. in the 20th minute and rose again in the 90th minute to 102° C. After 90 minutes 1,160 ml.$_n$ of gas were obtained.

| Composition of gas (free from inert constituents) | |
| --- | --- |
| acetylene | 15.2% by volume |
| vinyl bromide | 84.8% by volume |

EXAMPLE 8

107 grams of gaseous vinyl bromide were passed in the course of 74 minutes at a reaction temperature of 140° C. through a solution of 180 grams of barium oxide in 630 milliliters of ethylene glycol in a vertical glass tube having a length of about 1 meter and filled with Raschig rings, which tube was provided with a jacket.

17.5 l.$_n$ of gas were obtained. A sample of the gas taken 54 minutes after the start of the reaction had the following composition:

| | |
| --- | --- |
| acetylene | 87.8% by volume |
| vinyl bromide | 11.0% by volume |
| nitrogen | 0.01% by volume |
| oxygen | 0.01% by volume |
| hydrogen | 0.005% by volume |
| methane | 0.02% by volume |
| ethylene | 0.01% by volume |
| ethane | 0.01% by volume |

EXAMPLE 9

In an autoclave of V$_4$A steel having a capacity of 200 cc. 10 grams of calcium oxide were heated for 35 minutes at 150° C. together with 100 milliliters of water and 18.8 grams of 1,2-dibromoethane. When the pressure was released at room temperature 1,830 ml.$_n$ of gas were obtained.

| Composition of gas (free from inert constituents) | |
| --- | --- |
| acetylene | 14.5% by volume |
| vinyl bromide | 85.4% by volume |
| ethylene | 0.1% by volume |
| hydrogen | <0.01% by volume |

EXAMPLE 10

The experiment was carried out as described in Example ml.$_9$ with the exception that 48 grams of strontium hydroxide octahydrate and 70 milliliters of water were used instead of 10 grams of calcium oxide and 100 milliliters of water. After pressure release at room temperature 1,960 ml.$_n$ of gas were obtained.

| Composition of gas (free from inert constituents) | |
| --- | --- |
| acetylene | 59.2% by volume |
| vinyl bromide | 40.7% by volume |
| ethylene | 0.01% by volume |
| hydrogen | <0.1% by volume |

EXAMPLE 11

The experiment was carried out as described in Example 9 with the exception that 57 grams of barium hydroxide octahydrate and 70 milliliters of water were used instead of 10 grams of calcium oxide and 100 milliliters of water. After pressure release at room temperature 1,960 ml.$_n$ of gas were obtained.

| Composition of gas (free from inert constituents) | |
| --- | --- |
| acetylene | 63.7% by volume |
| vinyl bromide | 35.1% by volume |
| ethylene | 0.1% by volume |
| hydrogen | 1.1% by volume |

We claim:

1. A process for the manufacture of an alkyne by dehydrohalogenation of a starting compound selected from the group consisting of dihalogen-alkanes, monohalogen-alkenes and mixtures thereof, which comprises reacting said starting compound, in a high-boiling polyhydric alcohol, with a stoichiometric excess of a reactant selected from the group consisting of calcium, strontium and barium oxides, hydroxides and mixtures thereof at a temperature in the range of from 100 to 250° C. with a residence time of 5 to 500 seconds.

2. The process of claim 1 wherein the starting compound is a dibromo-alkane or monobromo-alkene.

3. The process of claim 2, wherein the alkane is a member selected from the group consisting of 1,2-dibromoethane, 1,2-dibromopropane, 2,3-dibromobutane and 1,2-dibromobutane.

4. The process of claim 1, wherein the monohalogen alkene is a member selected from the group consisting of vinyl bromide, 1-bromopropene-1, 2-bromobutene-2 and 1-bromobutene-bromobutene-1.

5. The process of claim 1, wherein the polyhydric alcohol is ethylene glycol, butane-diol-(1,4) or glycerol.

6. The process of claim 1 wherein the reactant is barium oxide and the polyhydric alcohol is ethylene glycol.

7. The process of claim 1, wherein the reactant is barium oxide or barium hydroxide.

8. The process of claim 1, wherein the dehydrohalogenation is carried out at a temperature of 140° C. with a residence time of 80 seconds.

9. A process for the manufacture of an alkyne from the corresponding alkene which comprises brominating the alkene to the corresponding 1,2-dibromo-alkane; dehydrobrominating the said 1,2-dibromo-alkane by reaction with a stoichiometric excess of a reactant selected from the group consisting of calcium, strontium and barium oxides, hydroxides and mixtures thereof in a solution of a high-boiling polyhydric alcohol to the corresponding alkine; thermally hydrolyzing the calcium, strontium or barium bromide formed as a byproduct to the corresponding oxide or hydroxide and to bromine or hydrogen bromide; recycling the bromine or hydrogen bromide for bromination of additional alkene; and recycling the oxide or hydroxide for hydrobromination of additional 1,2-dibromo-alkane.

10. The process of claim 9 wherein the initial alkene is ethylene, the reactant is barium oxide, and the end product is acetylene.